United States Patent
McCormack et al.

(10) Patent No.: US 11,461,717 B2
(45) Date of Patent: Oct. 4, 2022

(54) DEVICE, SYSTEM, AND METHOD FOR AUTOMATED VEHICLE GUIDANCE SYSTEM

(71) Applicant: Avaya Inc., Santa Clara, CA (US)

(72) Inventors: Tony McCormack, Galway (IE); John H. Yoakum, Cary, NC (US); Joe Smyth, Galway (IE)

(73) Assignee: Avaya, Inc., Santa Clara, CA (US)

( * ) Notice: Subject to any disclaimer, the term of this patent is extended or adjusted under 35 U.S.C. 154(b) by 1556 days.

(21) Appl. No.: 14/804,986

(22) Filed: Jul. 21, 2015

(65) Prior Publication Data

US 2017/0024671 A1    Jan. 26, 2017

(51) Int. Cl.
| | |
|---|---|
| *G06Q 10/06* | (2012.01) |
| *G08G 5/00* | (2006.01) |
| *B64C 39/02* | (2006.01) |
| *G08G 1/00* | (2006.01) |

(52) U.S. Cl.
CPC ..... *G06Q 10/06315* (2013.01); *B64C 39/024* (2013.01); *B64C 2201/12* (2013.01); *B64C 2201/123* (2013.01); *G08G 1/205* (2013.01); *G08G 5/0043* (2013.01); *G08G 5/0069* (2013.01)

(58) Field of Classification Search
CPC ............ G06Q 10/06315; B64C 39/024; B64C 2201/12; B64C 2201/123; G08G 1/205; G08G 5/0043; G08G 5/0069
USPC ....................................................... 705/7.25
See application file for complete search history.

(56) References Cited

U.S. PATENT DOCUMENTS

| | | | |
|---|---|---|---|
| 8,930,044 B1 * | 1/2015 | Peeters ................... | B64C 19/00 701/2 |
| 9,051,043 B1 * | 6/2015 | Peeters ................... | B64C 19/00 |
| 9,075,415 B2 * | 7/2015 | Kugelmass ............ | G05D 1/101 |
| | (Continued) | | |

FOREIGN PATENT DOCUMENTS

CN    105988478 A  *  10/2016   ....... G06Q 10/08355

OTHER PUBLICATIONS

Gatteschi, New Frontiers of Delivery Services Using Drones: A Prototype System Exploiting a Quadcopter for Autonomous Drug Shipments, Jul. 5, 2015, https://ieeexplore.ieee.org/stamp/stamp.jsp?tp=&arnumber=7273724, p. 1-8.*

*Primary Examiner* — Patricia H Munson
*Assistant Examiner* — James Webb (57) ABSTRACT

A device, system, and method determines a prioritized location for an automated vehicle to move. The method performed at a contact center includes performing a transaction between an electronic device and the contact center, the transaction including at least one correspondence. The method includes determining location data corresponding to the electronic device, the location data being a location of the electronic device. The method includes determining prioritized location data based upon the location data and further related data, the further related data being at least one of an analysis of the at least one correspondence, internal information of the contact center, and external information available to the contact center. The method includes transmitting the prioritized location data to an unmanned, automated vehicle (UAV), the UAV configured to automatically move to a predetermined location based upon the prioritized location data.

20 Claims, 4 Drawing Sheets

(56) References Cited

U.S. PATENT DOCUMENTS

| | | | |
|---|---|---|---|
| 9,158,304 B2* | 10/2015 | Fleck | G05D 1/0011 |
| 9,346,543 B2* | 5/2016 | Kugelmass | G05D 1/101 |
| 9,346,544 B2* | 5/2016 | Kugelmass | G05D 1/101 |
| 9,363,008 B2* | 6/2016 | Boss | H04W 84/06 |
| 9,384,668 B2* | 7/2016 | Raptopoulos | G08G 5/0069 |
| 9,434,473 B2* | 9/2016 | Peeters | B64C 19/00 |
| 9,436,181 B2* | 9/2016 | Peeters | B64C 19/00 |
| 9,596,024 B2* | 3/2017 | Chang | H04W 4/90 |
| 9,665,094 B1* | 5/2017 | Russell | G05D 1/00 |
| 9,817,396 B1* | 11/2017 | Takayama | G05D 1/0038 |
| 9,911,088 B2* | 3/2018 | Nath | G06Q 10/06 |
| 9,948,898 B2* | 4/2018 | Barfield, Jr. | H04N 7/185 |
| 10,089,889 B2* | 10/2018 | Patterson | B64C 39/024 |
| 10,102,586 B1* | 10/2018 | Marlow | G06Q 40/08 |
| 10,163,177 B2* | 12/2018 | Farris | A47G 29/122 |
| 2014/0032034 A1* | 1/2014 | Raptopoulos | G08G 5/0069 701/25 |
| 2014/0164126 A1* | 6/2014 | Nicholas | A63F 9/24 705/14.58 |
| 2014/0180914 A1* | 6/2014 | Abhyanker | G01C 1/00 705/39 |
| 2014/0316616 A1* | 10/2014 | Kugelmass | G05D 1/101 701/8 |
| 2014/0330456 A1* | 11/2014 | Lopez Morales | G06Q 10/08355 701/3 |
| 2015/0094883 A1* | 4/2015 | Peeters | B64C 19/00 701/3 |
| 2015/0120094 A1* | 4/2015 | Kimchi | B64C 39/024 701/3 |
| 2015/0148988 A1* | 5/2015 | Fleck | G05D 1/0011 701/2 |
| 2015/0317582 A1* | 11/2015 | Nath | G06Q 10/06 705/7.13 |
| 2015/0353195 A1* | 12/2015 | Peeters | B64C 19/00 701/3 |
| 2015/0379874 A1* | 12/2015 | Ubhi | G01S 5/0027 701/3 |
| 2016/0012393 A1* | 1/2016 | Wang | G06Q 10/08355 705/338 |
| 2016/0028471 A1* | 1/2016 | Boss | H04W 84/06 455/406 |
| 2016/0033966 A1* | 2/2016 | Farris | A47G 29/122 701/15 |
| 2016/0046373 A1* | 2/2016 | Kugelmass | G05D 1/101 701/8 |
| 2016/0046374 A1* | 2/2016 | Kugelmass | G05D 1/101 701/8 |
| 2016/0093212 A1* | 3/2016 | Barfield, Jr | H04N 7/185 348/144 |
| 2016/0156409 A1* | 6/2016 | Chang | H04W 4/90 370/315 |
| 2016/0191142 A1* | 6/2016 | Boss | H04W 84/06 455/405 |
| 2017/0090484 A1* | 3/2017 | Obaidi | B64C 39/024 |

\* cited by examiner

DEVICE, SYSTEM, AND METHOD FOR AUTOMATED VEHICLE GUIDANCE SYSTEM

BACKGROUND INFORMATION

A contact center may be used by a provider to initiate a transaction that enables a user to request information and/or request that an issue or service handled by the provider be provided. The contact center may receive an incoming correspondence from the user regarding the request. The contact center may allow its agent to handle the transaction or may be equipped with an automated system that requests information from the user to properly provide the requested service. During the course of the transaction, the agent or the automated system may provide an appropriate response for the user. That is, the agent and/or the automated system may be responsible for handling the session. Other devices used by the contact center such as a server may be relegated to functionalities such as recording the session, forwarding the session (e.g., to another agent, to the automated system, etc.), etc.

The contact center may also have access to various devices that are associated with handling any given session. As those skilled in the art will understand, a network of physical objects having electronics, programming, sensors, etc. may collectively be referred to as the Internet of Things (IoT). These physical objects of the IoT may include a connectivity functionality to provide further value and service by exchanging data with other connected devices including those of the contact center. As the IoT becomes prolific, the physical devices that may become incorporated may be airborne automated vehicles such as drones. That is, these drones may become mainstream with widespread usage and integration into society. The drones may aid as key contributors of data (e.g., sensor data, video data, and/or audio data), particularly at remote geographical locations.

However, drones have a substantially high cost associated therewith and may be a limited resource where the contact center may only have access to a limited, set number of drones. Therefore, the use of the drones may require various considerations to optimize this limited resource.

SUMMARY OF THE INVENTION

The present invention describes a method: at a contact center, performing a transaction between an electronic device and the contact center, the transaction including at least one correspondence between a user of the electronic device and the contact center; determining location data corresponding to the electronic device, the location data being indicative of a location of the electronic device; determining prioritized location data based upon the location data and further related data, the further related data being at least one of an analysis of the at least one correspondence, internal information of the contact center, and external information available to the contact center; and transmitting the prioritized location data to an unmanned, automated vehicle (UAV), the UAV configured to automatically move to a predetermined location based upon the prioritized location data.

The present invention describes a server of a contact center which includes a transceiver configured to transmit data to an unmanned, automated vehicle (UAV); and a processor configured to perform a transaction with an electronic device, the transaction including at least one correspondence between a user of the electronic device and an agent of the contact center, the processor configured to determine location data corresponding to the electronic device, the location data being indicative of a location of the electronic device, the processor configured to determine prioritized location data based upon the location data and further related data, the further related data being at least one of an analysis of the at least one correspondence, internal information of the contact center, and external information available to the contact center, wherein the transceiver is configured to transmit the prioritized location data to the UAV, the UAV configured to automatically move to a predetermined location based upon the prioritized location data.

The present invention describes a system which includes an unmanned, automated vehicle (UAV) configured to receive a prioritized location data and automatically move to a predetermined location based upon the prioritized location data; and a server of a contact center configured to: perform a transaction with an electronic device, the transaction including at least one correspondence between a user of the electronic device and an agent of the contact center; determine location data corresponding to the electronic device, the location data being indicative of a location of the electronic device; determine the prioritized location data based upon the location data and further related data, the further related data being at least one of an analysis of the at least one correspondence, internal information of the contact center, and external information available to the contact center; and transmit the prioritized location data to the UAV.

DETAILED DESCRIPTION

The exemplary embodiments may be further understood with reference to the following description and the related appended drawings, wherein like elements are provided with the same reference numerals. The exemplary embodiments are related to a device, system, and method for a contact center based automated vehicle guidance system. Specifically, the exemplary embodiments provide a mechanism in which a contact center performs transactions from users that provide a basis to determine a prioritized location. Through incorporating further data, the prioritized location may be determined which is transmitted to an automated vehicle. Accordingly, the drone may move to the prioritized location. The contact center, the automated vehicle guidance system, the automated vehicle, the transactions, the further data, the prioritized location, and related methods will be described in further detail below.

The exemplary embodiments relate to providing real-time guidance information to automated vehicles based at least upon an analysis of transactions (e.g., for a drone). For example, the transactions may be from correspondences in a contact center where the transactions may include voice calls, video sessions, chat interactions, social media interactions, emails, or other forms of interactions. Based upon the information gathered from the transactions, the guidance data may be gathered to generate prioritized location data that determines areas of interest for the vehicle (e.g., a drone) to move.

Figure 1:
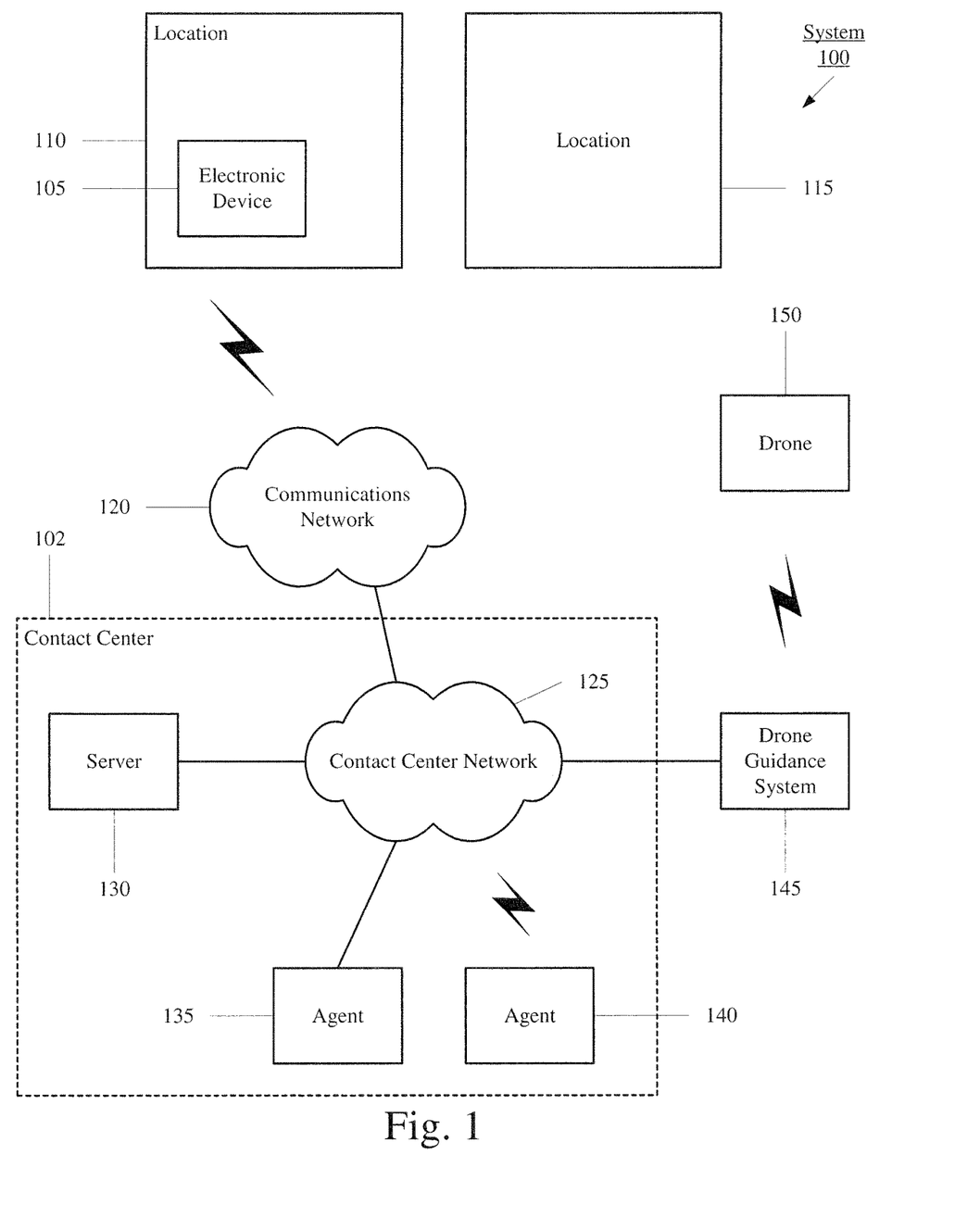
FIG. 1 shows an exemplary system according to the present invention.

FIG. 1 shows an exemplary embodiment of a system 100 according to the present invention. The system 100 facilitates a user's transaction with a contact center 102. The transaction between the user and the contact center 102 may provide a basis upon which guidance data is formed. That is, the contact center 102 may gather this guidance data for subsequent operations involving control of movement of a drone. The system 100 may include the contact center 102, an electronic device 105, a communications network 120, a contact center network 125, a server 130, a plurality of agents 135, 140, a drone guidance system 145, and a drone 150.

The electronic device 105 may be any device that is associated with a user who interacts with the contact center 102 via a transaction. The electronic device 105 may be any device that is configured to perform a plurality of functionalities such as a transaction application that enables a correspondence to be performed between the user and the contact center 102 such as a call, an email, a message, etc. The electronic device 105 may be a portable device such as a tablet, a laptop, a smart phone, a wearable, etc. The electronic device 105 may also be a stationary device such as a desktop terminal.

The electronic device 105 is illustrated as being disposed in a general area defined as a location 110. Accordingly, when known mechanisms are used to determine the location in which the electronic device 105 is disposed such as global positioning systems, triangulation, etc., the location 110 may be known. There may be further locations such as location 115 that may be relevant to the transaction between the electronic device 105 and the contact center 102. The locations 110, 115 will be described in further detail below.

The communications network 120 may be any type of network that enables data to be transmitted from a first device to a second device where the devices may be the electronic device 105 and a device of the contact center 102. Specifically, the communications network 120 may be configured for the transaction between the electronic device 105 and the contact center 102 to be performed where the data relates to correspondences of the transaction. For example, the communications network 120 may be a local area network (LAN), a wide area network (WAN), a virtual LAN (ULAN), a WiFi network, a HotSpot, a cellular network, a cloud network, a wired form of these networks, a wireless form of these networks, a combined wired/wireless form of these networks, etc. The communications network 120 may also represent one or more networks that are configured to connect to one another to enable the data to be exchanged between the electronic device 105 and the contact center 102.

The contact center 102 may be any entity that performs transactions of requests to provide a service, product, and/or information. When utilized for transactions, the contact center 102 may administer product support or information inquiries from users such as the user utilizing the electronic device 105. The contact center 102 may handle the transactions that may include individual communications such as calls, letters, faxes, live support software, social media, instant message, e-mail, etc. The transactions between the electronic device 105 and the contact center 102 may be performed in a variety of manners. In a first example, the transaction may be an incoming transaction in which the user of the electronic device 105 contacts the contact center 102 (e.g., the transaction originates from the electronic device 105). In a second example, the transaction may be an outgoing transaction in which the contact center 102 contacts the user of the electronic device 102 (e.g., the transaction originates from the contact center 102). The contact center 102 may include a plurality of components such as those illustrated in the system 100 including the contact center network 125, the server 130, and the agent devices 135, 140.

The contact center network 125 may enable a plurality of devices of the contact center 102 to be interconnected with one another. For example, the contact center network 125 may be a proprietary network accessible in one manner by the agent devices 135, 140 and the server 130 as well as other devices (not shown) such as a supervisor device, an automated system, etc. The agent devices 135, 140 and the server 130 may be connected to the contact center network 125 via an authorized or privileged connection for select information and data to be accessed. The connection established via the communications network 120 for the electronic device 105 and the contact center 102 may be a different type of connection that enables the transaction to be performed.

The contact center network 125 may also enable direct connections thereto using, for example, both wired and wireless connections. Specifically, the agent device 130 may utilize a wired connection to establish the connection with the contact center network 125. The agent device 140 may utilize a wireless connection to establish the connection with the contact center network 125. Furthermore, the agent device 135 and the agent device 140 may be within a predetermined proximity of the contact center network 125 in order to establish the connection. In addition, the contact center network 125 may enable remote connections thereto using, for example, the communications network 120. For example, an agent may work remotely from a location that is outside the proximity of the contact center network 125. Using authentication, authorization, and accounting (AAA) procedures (via a AAA server (not shown)), the remote agent device (not shown) may establish a connection with the contact center network 125 in a substantially similar manner as the agent devices 135, 140.

In view of the above description of the contact center network 125, it should be noted that the contact center network 125 may include a variety of components (not shown) to enable these functionalities. For example, the contact center network 125 may include a server, a router, a switch center, a network management arrangement, a database, etc. It should also be noted that the use of two agent devices 135-140 that are shown in the system 100 is only exemplary. Those skilled in the art will understand that the contact center 102 may utilize any number of agent devices.

The server 130 may be any contact center network device that performs a plurality of functionalities to define a manner in which the contact center 102 operates. For example, the server 130 may determine how incoming transactions are to be performed or handled and select an agent for the transaction. According to the exemplary embodiments, the server 130 may include further functionalities regarding a generation of prioritized location data to be used by the drone 150. The server 130 will be described in further detail below. It should be noted that the use of the server 130 is only exemplary. In other exemplary embodiments, a different component may be configured to perform the functionalities described herein.

The agent devices 135, 140 may be utilized by a respective agent to receive a request from a user of the electronic device 105 to perform the transaction. For example, when the user performs a call to connect with the contact center 102, the transaction may be a real-time communication between the electronic device 105 and the contact center 102. The agent devices 135, 140 may also represent any electronic device that is configured to perform the known functionalities associated with agents of the contact center 102 such as providing information and/or services corresponding to the request of the transaction. The agent devices 135, 140 may also represent an automated transaction device that is configured to perform the transaction in an automatic process (i.e., without an agent). Accordingly, the performance of a transaction between a user of the electronic device 105 and the contact center 102 described herein may be with an agent, without an agent, or a combination thereof (e.g., a transaction is transferred from the automated transaction device to an agent device).

The system 100 relates to how a single user using the electronic device 105 has a transaction with the contact center 102. Thus, the system 100 only shows a single electronic device 105. However, in a substantially similar manner as there being any number of agent devices 135, 140, the exemplary embodiments are configured for a plurality of users to contact the contact center 102 such that there is at least one incoming transaction. That is, in other scenarios, there may be a plurality of transactions from more than one user using a respective electronic device to the contact center 102. The plurality of electronic devices may also be disposed in the location 110, in the location 115, in other locations, etc. Thus, the system 100 may illustrate the mechanism by which the electronic device 105 and other electronic devices perform a respective transaction with the contact center 102.

The drone guidance system 145 may include at least one electronic device that is configured to provide data to the drone 150. The drone guidance system 145 is illustrated as a separate system from the contact center 102. Thus, the drone guidance system 145 may be a separate entity from the contact center 102 that is retained by the contact center for use of the drone 150. The drone guidance system 145 may represent an automated or manually controlled system in which an operator or user controls a manner in which the drone 150 operates. For example, the drone guidance system 145 may identify a location that the drone 150 is to move (e.g., the location 110, the location 115, return to base, etc.). Accordingly, the drone guidance system 145 may include a transmission mechanism to transmit the data to the drone 150. In a similar manner, the drone 150 may include a transmission mechanism to receive the data. The transmission mechanisms of the drone guidance system 145 and the drone 150 may be through a proprietary or secured connection such that the drone 150 is only controlled by the drone guidance system 145.

It should be noted that the drone guidance system 145 being a separate system of the contact center 102 is only exemplary. In another exemplary embodiment, the drone guidance system 145 may be a system of the contact center 102 such that the drone guidance system 145 is operated (and/or also owned) by the contact center 102. In this manner, the drone 150 may also be operated (and/or owned) by the contact center 102. It should also be noted that the use of the drone guidance system 145 is only exemplary. In another exemplary embodiment, the server 130 may also be configured to incorporate the functionalities of the drone guidance system 145 such that the server 130 may transmit data to the drone 150 without using intermediary systems.

The drone 150 may represent any airborne (i.e., aerial), automated (i.e., unmanned) vehicle. The flight of the drone 150 may be controlled autonomously by onboard computers as dictated by an operator that has transmitted instructions thereto. It is noted that the drone 150 may not only be a drone as those skilled in the art will understand. The drone 150 according to the exemplary embodiments may be any device that may perform the functionalities associated with a conventional drone (with the further functionalities as related to the exemplary embodiments). The drone 150 being unmanned is only exemplary, being airborne is only exemplary, and being automated is only exemplary. That is, the drone 150 may also relate to a device that may be manned, that may be non-airborne (such as a land vehicle), that may be manually operated (such as a remotely piloted aircraft), a combination thereof, etc. Accordingly, the drone 150 may represent any vehicle that may provide the intended functionalities using any mechanism.

It should be noted that the exemplary embodiments are configured for a plurality of drones to be utilized by the contact center 102 via the drone guidance system 145. The system 100 may illustrate the mechanism by which the drone 150 and other drones are provided data for operation thereof from the contact center 102.

The drone 150 may be equipped with a variety of components that enable subsequent features for the exemplary embodiments. In a first example, the drone 150 may include an image capturing device to capture at least one image and/or video. The images may be captured and transmitted to the drone guidance system 145 which may subsequently transfer the images to the contact center 102 (or use a direct transmission pathway to the contact center 102). In a second example, the drone 150 may include an audio input device to capture audio at a location that the drone 150 is disposed. The captured audio may be relayed back to the contact center 102. In a third example, the drone 150 may include an audio output device to play audio from an operator such as an agent of the contact center 102. The played audio may be for any purpose such as providing instructions. In a fourth example, the drone 150 may include a holding compartment which may deliver an item to a person at an intended location the drone 150 is to move or pick up an item from the person at the intended location. In a fifth example, the drone 150 may include environmental or other types of sensors to generate corresponding data.

Figure 2:
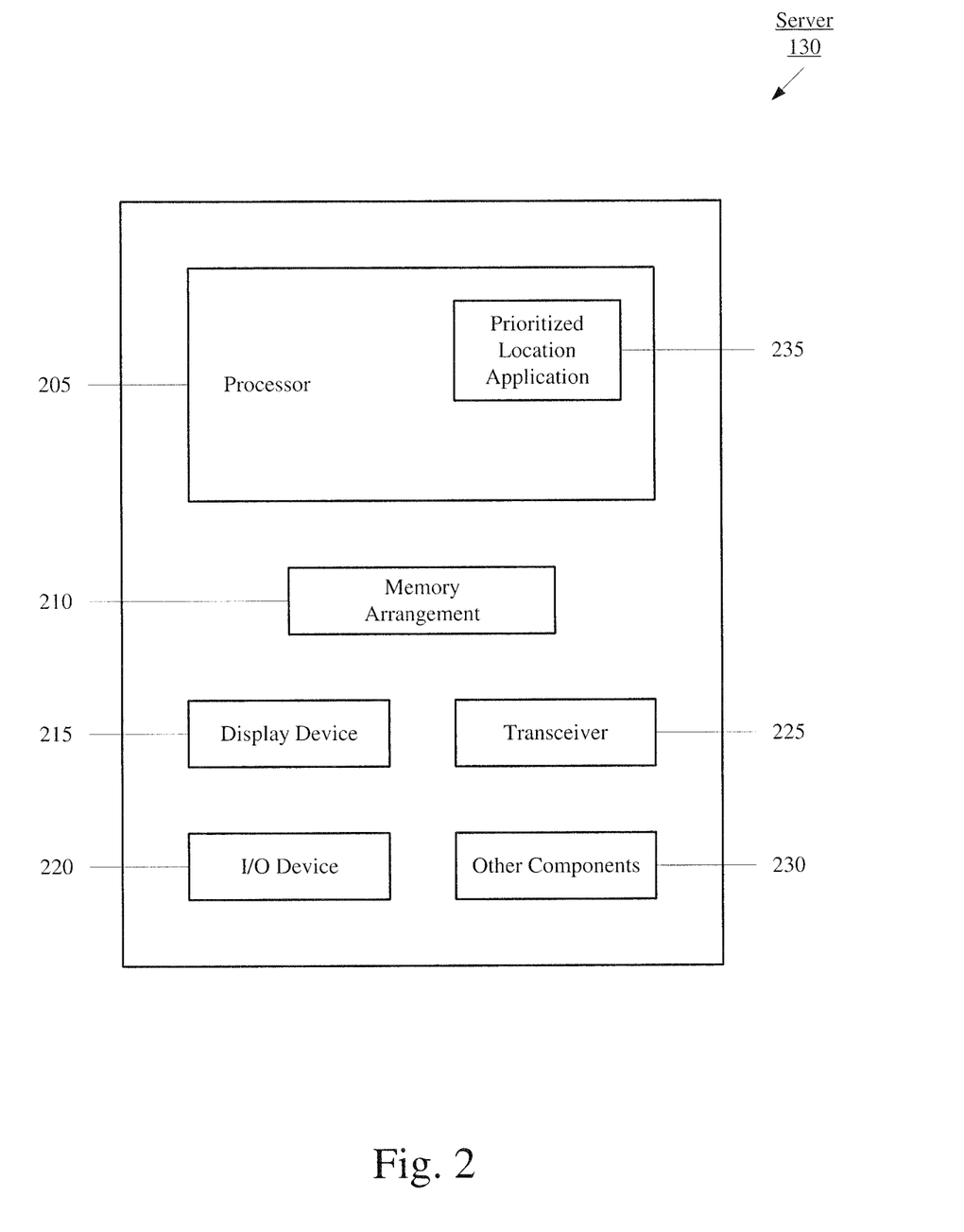
FIG. 2 shows an exemplary server according to the present invention.

As discussed above, the server 130 of the exemplary embodiments may be configured with further functionalities to generate prioritized location data for the drone 150. FIG. 2 shows an exemplary embodiment of the server 130 of FIG. 1 according to the present invention. The server 130 may include a processor 205, a memory arrangement 210, a display device 215, an input/output (I/O) device 220, a transceiver 225, and other components 235 (e.g., an audio output device, an audio input device, a battery, a data acquisition device, ports to electrically connect the server 130 to other electronic devices, etc.).

The processor 205 may be configured to execute a plurality of applications of the server 130. For example, the processor 205 may execute a browser application when connected to the communications network 125 via the transceiver 225. In another example, the processor 205 may execute a retrieving application that is configured to search various sources for information based upon an initial input. As will be described in further detail below, the retrieving application may provide further data that is used in determining the prioritized location. In yet another example, the processor 205 may execute a prioritized location application

235. The prioritized location application 235 may be configured to analyze the incoming transactions of the contact center 102 and also incorporate the further data to determine the prioritized location. The mechanism by which the prioritized location application 235 performs this functionality and its subsequent use will be discussed below.

It should be noted that the above noted applications, each being an application (e.g., a program) executed by the processor 205, is only exemplary. The functionality associated with the applications may also be represented as a separate incorporated component of the server 130 or may be a modular component coupled to the server 130, e.g., an integrated circuit with or without firmware.

The memory arrangement 210 may be a hardware component configured to store data related to operations performed by the server 130. Specifically, the memory arrangement 210 may store data related to the transactions of the contact center 102 as well as guidance data and/or further information which may subsequently be used in determining the prioritized location. For example, a first transaction may be related in determining the prioritized location. At least one second transaction may subsequently be analyzed to also be related in determining the prioritized location. Accordingly, the storage of the relevance from the first transaction may be performed for this feature.

The display device 215 may be a hardware component configured to show data to a user while the I/O device 220 may be a hardware component that enables the user to enter inputs. The display device 215 and the I/O device 220 may be utilized by an administrator or user to monitor and/or provide settings for which the contact center 102 is to operate. It should be noted that the display device 215 and the I/O device 220 may be separate components or integrated together such as a touchscreen. The transceiver 225 may be a hardware component configured to transmit and/or receive data in a wired or wireless manner. Specifically, the transceiver 225 enables data to be exchanged with the contact center network 125 which may further enable data to be exchanged with further networks (e.g., communications network 120) or other components (e.g., drone guidance system 145).

According to the exemplary embodiments, the server 130 of the contact center 102 may be configured to determine a prioritized location such that prioritized location data (corresponding to the prioritized location) may be transmitted to the drone 150 via the drone guidance system 145. As discussed above, the server 130 may utilize various sources of information to determine the prioritized location. For example, the transactions at the contact center 102 may form at least a partial (if not complete) basis for the prioritized location to be determined, including accessing information the contact center 102 has previously stored in relation to some identity factor related to the incoming transaction. In another example, the server 130 may utilize the retrieving application to search for further information such as publicly available information on the Internet or other mediums such as social media sites that may be incorporated in determining the prioritized location.

The prioritized location application 235 of the server 130 may be configured to perform a plurality of operations to determine the prioritized location. The determining of the prioritized location may represent a first aspect of the exemplary embodiments. As will be described below, a second aspect of the exemplary embodiments may entail using the prioritized location with the drone 150 as well as ordering a plurality of prioritized locations for optimizing a use of the drone 150.

Initially, with regard to the first aspect, the transactions may be analyzed to determine location data corresponding to the respective transaction. Subsequently, the prioritized location application 235 may be configured to utilize various other information along with the location data of the transactions. Using the location data and the other information, the prioritized location application 235 may determine the one or more prioritized locations. An example of this operation will be described below. The exemplary scenario described herein relates to the transactions at the call center 102 being voice calls. However, those skilled in the art will understand that any customer interaction may be used in a substantially similar manner as the voice calls discussed herein such as video calls, emails, chat sessions, etc.

According to the exemplary scenario, the server 130 may monitor the calls at the contact center 102. This monitoring operation may enable the calls at the contact center 102 to be analyzed to determine location information. The location information may be indicative of where the source of the transaction originates. For example, the electronic device 105 may be the source for the transaction. The location information using any known mechanism or being manually provided may be indicative of the location 110 where the electronic device 105 is disposed. The location information may be fine-grained such that the detailed address is determined (e.g., known for fixed line calls) or course-grained such that a general location is determined (e.g., based upon an area code).

The server 130 may subsequently utilize analysis techniques to determine the one or more prioritized locations. The prioritized location may be based upon a variety of factors using any kind of analysis technique. In a first example, a determination of locations with high incoming call volumes may provide a partial basis in determining the prioritized location. For example, within a certain time frame (that may or may not be a predetermined time value), there may be at least a minimum number of incoming calls originating from electronic devices in a common area such as the location 110. The analysis technique may also extend the common area to incoming calls originating adjacent locations to the common area. An increased frequency of incoming calls originating from a common area may be indicative of the prioritized location. Accordingly, the prioritized location may be determined in this manner.

In a second example, a determination of locations with highly important calls may be determined. For example, incoming calls may be analyzed to determine whether they relate to relatively higher importance events such as an emergency situation. The incoming calls may be analyzed using any known technique such as voice analysis, text analysis, metadata analysis, etc. to determine whether the incoming call in fact relates to a high importance event or not. Thus, although the highly important calls (especially when related to an emergency situation) may also correspond to incoming calls originating from a common area, this criteria may utilize a lower minimum number of incoming calls to still qualify as a prioritized location. Accordingly, the prioritized location may be determined in this manner.

In a third example, a determination of locations with correlations to other data available to the contact center may be determined. For example, the other data may be from the retrieving application that uses sources outside the incoming transactions. These sources may include internal data (e.g., known incidents or events such as an accident in the case of an emergency use case or marketing event in the case of a non-emergency use case) or external data (e.g., social media or news feeds). Thus, the location data corresponding to the incoming calls may be determined to be a first location (e.g., location 110) but through analysis of the incoming calls as well as the other information, the prioritized location may be determined in a second location (e.g., location 115) such as a neighboring location. Accordingly, the prioritized location may be determined in this manner.

In a fourth example, a determination of locations with correlations to information extracted from other forms of analytics may be determined. For example, another form of analytics may be speech analytics. The use of speech analytics may provide indications to various types of events such as life threatening situations from live agent calls in the contact center. When the analytics provide such a result, the location data may be determined from a single instance due to the nature of the transaction. Accordingly, the prioritized location may be determined in this manner.

In a fifth example, the transaction may have metadata or other associated information that may be determined. The other associated information of the transaction may include identity factors that may have previously been determined and stored. Thus, the identity factors may provide further information already known to the contact center 102 that may provide indications to a prioritized location. For example, a previous transaction may have provided insight as to a type of location (e.g., a residence, a business, an open area, etc.) which may be an identity factor that the server 130 uses in determining the prioritized location. In another example, a transaction may be for a user who is identified to correspond to a previous transaction. Accordingly, the prioritized location may be determined in this manner.

In a specific example, the prioritized location may be directly or indirectly related to the location data of the electronic device. For example, the electronic device 105 and a plurality of other electronic devices may report an event such as an accident that occurred. The users of the electronic devices may be within an immediate area such that the location 110 may be determined to be the prioritized location. However, in another example, the accident may have caused the users of the electronic devices to have moved to safety in a different location. Accordingly, the transactions from the electronic devices may relate to location data corresponding to the location 110 but the event may be nearby in a different area such as the location 115 as determined with other information such as voice analytics of what is being stated in the transactions, news feeds, etc. In yet another specific example, the prioritized location may be derived directly from the location data specific to the electronic device 105. As discussed above, one analysis may be speech analytics such that a life threatening situation may translate directly into a prioritized location.

It should be noted that the above examples to determine the prioritized location are only exemplary. The exemplary embodiments may utilize any number of analysis techniques as well as any combination thereof. It should also be noted that the above examples may utilize any mechanism such as incorporating predetermined thresholds in determining the prioritized location. For example, as discussed above, the first example for high incoming call volumes may utilize a call threshold that requires at least a minimum number of incoming calls within a time threshold. In another example, the second example may utilize a different call threshold given the circumstances surrounding the event of the relatively high importance incoming calls. In a further example, the fourth example may utilize any call threshold greater than zero as the emergency circumstances may allow for any incoming call to be related to the prioritized location.

Once the prioritized location has been determined by the prioritized location application 235 of the server 130, the prioritized location may be included in prioritized location data that is processed and provided to the drone 150. As discussed above, this may relate to the second aspect of the exemplary embodiments. The prioritized location data may be processed via a variety of different components of the system 100. The exemplary embodiments described below relate to the server 130 processing the prioritized location data and generating a queue indicating an order in which the drone 150 is to move. It is noted that the server 130 may also determine an operation to be performed at the prioritized location. Accordingly, the drone guidance system 145 is only configured to receive the queue and transmit the queue to the drone 150. However, it should be noted that the use of the server 130 for this functionality is only exemplary. In other embodiments, the functionalities described below for the second aspect may be performed by a different component of the contact center 102, the drone guidance system 145, the drone 150, or some combination thereof. Accordingly, these components may include the proper hardware and/or software to perform these functionalities.

The server 130 (via the prioritized location application 235) may determine the prioritized location data and also utilize a current queue of prioritized locations that the drone 150 is commanded to move and perform a predetermined operation. Initially, upon determining the prioritized location, the server 130 may determine which one among a plurality of drones 150 to include the determined prioritized location. For example, as discussed above, the contact center 102 may have access to more than one drone 150. However, if the contact center 102 has access to only one drone 150, this step may be bypassed. The server 130 may determine which drone 150 to assign the prioritized location based upon any number of criteria. For example, the criteria may be a load (as indicated by the queue) respective of the drone 150, a current position of the drone 150, remaining prioritized locations in the queue of the drone 150, technical attributes of the drone 150 to perform the predetermined operation, remaining capacity of the drone 150 (e.g., a fuel gauge), a combination of these criteria, etc.

Once the drone 150 has been selected, the server 130 may receive the queue of the selected drone 150. For example, the queues of the available drones 150 may be stored in the memory arrangement 210. In another example, the drone guidance system 145 may store the queues of the drones 150. In a further specified example, the drone guidance system 145 may store updated queues of the drones 150 that indicate only remaining prioritized locations therein.

The queue for the selected drone 150 may include a list of the prioritized locations assigned thereto. Each of the prioritized locations may be arranged according to a variety of criteria. In a first example, the prioritized locations in the queue may be given an importance value. Thus, based upon the importance values, the prioritized locations may be ordered accordingly such that the drone 150 is directed to move to the prioritized locations from one having a highest importance value to one having a lowest importance value. In a second example, the prioritized locations in the queue may be listed in a temporal order. That is, the prioritized locations may be a first-in first-out order. In a third example, the prioritized locations in the queue may be ordered based upon a most optimal path for the drone 150 to take so that all prioritized locations are visited in the path to perform the intended operation. In a fourth example, the prioritized locations in the queue may be ordered based upon a combination of these criteria. For example, the queue may include a plurality of prioritized locations where a first prioritized location has a highest importance value, a second prioritized location has a second highest importance value, and a group of third prioritized locations each has a third highest importance value. Thus, the selected drone 150 may go to the first prioritized location to perform the intended operation and then go to the second prioritized location to perform the intended operation. Subsequently, the selected drone 150 may visit the group of the third prioritized locations as ordered in the queue based upon a most optimal path. Where one prioritized location does not offer a more optimal path than another prioritized location, the server 130 may simply utilize the temporal order in which the prioritized locations were determined.

Upon receiving the queue for the selected drone 150, the server 130 may determine how a currently determined prioritized location fits into the queue of the selected drone 150. That is, upon performing the first aspect described above, the currently determined prioritized location corresponding to the prioritized location data may be found. Again, any one or number of the above described criteria may be used. Using the above example with the first, second, and group of third prioritized locations, the currently determined prioritized location may be found to fit within the queue. For example, if the currently determined prioritized location has an importance value associated therewith, this value may be compared to the other importance values. If the importance value is of a standard importance such that it falls within the third group of prioritized locations, the currently determined prioritized location may be placed according to time or on an optimal path.

Once the position of the currently determined prioritized location is found, the server 130 may update the queue for the selected drone 150. The server 130 may transmit the updated queue to the drone guidance system 145 so that the updated queue may be transmitted to the drone 150. Upon receiving the updated queue, the drone 150 may alter its previously determined path to visit each of the prioritized locations in a prior queue to a new path to visit each of the prioritized locations in the updated queue. In this manner, the drone 150 may have the queue of prioritized locations to be dynamically updated and maintained. Therefore, the time spent in a given prioritized location to perform the intended operation by the drone 150 may be dynamically controlled to maximize coverage across all prioritized locations.

As discussed above, the drones 150 available to the contact center 102 may perform a respective, predetermined operation upon reaching each of the prioritized locations in the queue. The drones 150 may be equipped with the appropriate hardware and/or software to accomplish these operations. The drones 150 may also utilize any transceiver to receive the queue as well as transmit data associated with the operations. For example, if the prioritized location relates to an emergency situation, the drone 150 may utilize an image capturing device to capture images or video and/or utilize a sound capturing device to capture audio that is relayed back to the drone guidance system 145 or the contact center 102. In another example, if the prioritized location relates to a marketing event where the incoming transaction may have inquired about the product, the drone 150 may include a compartment for delivery of the product upon reaching the prioritized location corresponding to this event.

In updating the queue for the selected drone 150, it should be noted that further processes may be performed on the queue to maximize the operational parameters of the selected drone 150. For example, one of the prioritized locations in the queue of the selected drone 150 may be for a particular location. A currently determined prioritized location may be substantially near or at the same location. However, the predetermined operation to be performed at the location for the currently determined prioritized location may be different than what is intended for the prioritized location in the queue. The server 130 may therefore update the queue such that the selected drone 150 performs both operations while at the particular location corresponding to both prioritized locations. That is, prioritized locations may be combined. In another example, a first drone 150 may have malfunctioned such that a remaining queue of the first drone 150 cannot be completed. The server 130 may determine how each item in the remaining queue of the first drone 150 is to be incorporated into the available drones 150 where the remaining queue may be given to a single available drone, divided between the available drones, etc.

Figure 3:
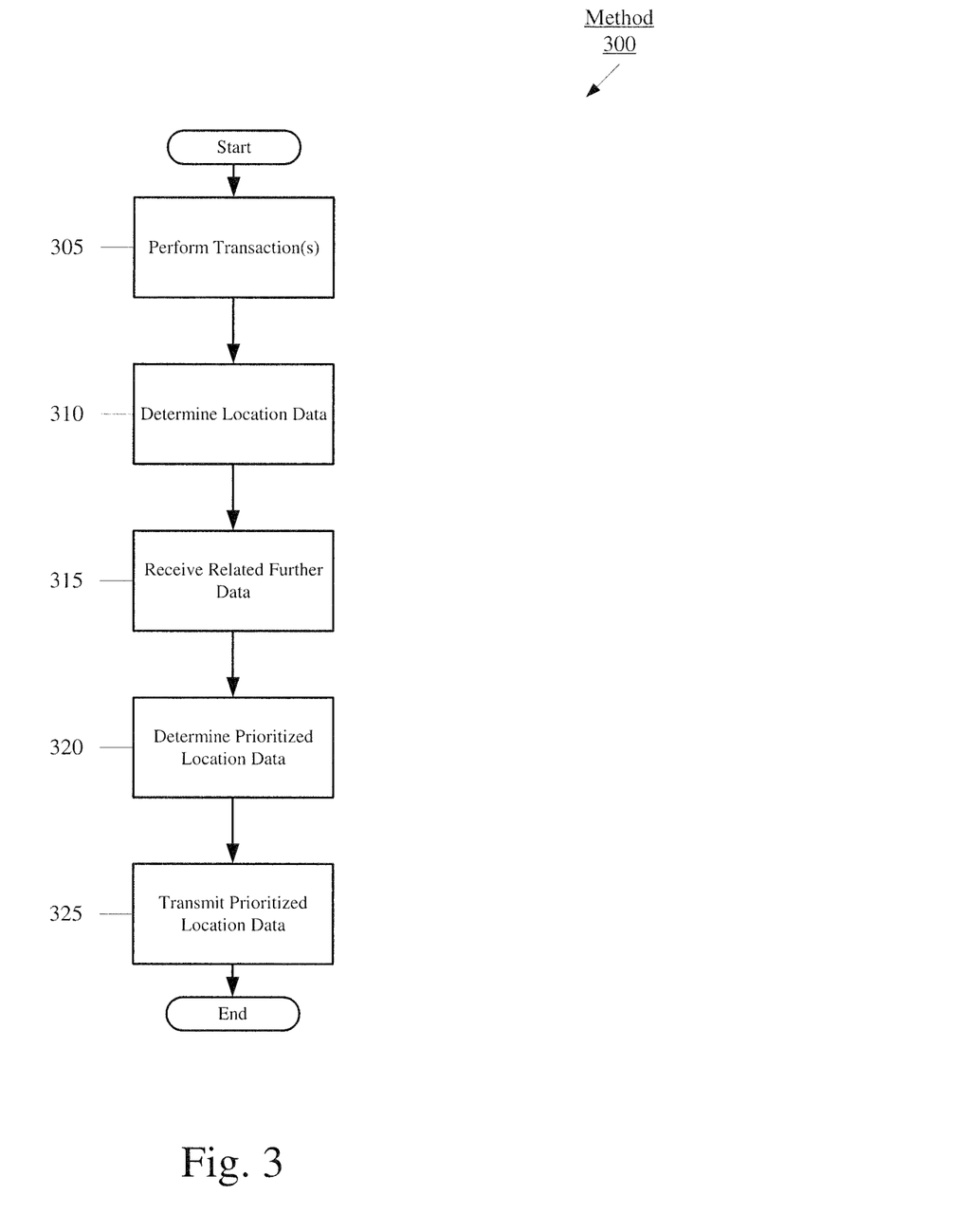
FIG. 3 shows an exemplary method of generating prioritized location data according to the present invention.

FIG. 3 shows an exemplary method 300 of generating prioritized location data according to the present invention. As discussed above, the exemplary embodiments may incorporate a first aspect in which the prioritized location data is generated which corresponds to a prioritized location that is determined. The method 300 may relate to this first aspect of the exemplary embodiments. The method 300 will be described with regard to the system 100 of FIG. 1 and the server 130 of FIG. 2. Accordingly, the method 300 is described with reference to the server 130 performing the functionalities herein. However, as discussed above, the functionalities may be performed by other devices such as those of the contact center 102.

In step 305, the contact center 102 performs at least one transaction. Specifically, the server 130 may monitor the transactions of the contact center 102. As discussed above, a user using the electronic device 105 may perform a transaction with the contact center 102 using any of a variety of types such as a voice call, a video call, a chat session, an email, etc. At least one further user using a respective electronic device may perform further transactions with the contact center 102 as well.

In step 310, the server 130 determines location data for each of the transactions. As discussed above, the location data for each transaction may be determined through any known mechanism. With land lines, the incoming transactions may be categorized in a specific manner (e.g., detailed address for fixed association) or in a general manner (e.g., area code). With mobile transactions, the location data associated with the transaction may be determined using known techniques (e.g., triangulation, global positioning, etc.).

In step 315, the server 130 receives any related further data. As discussed above, the server 130 may utilize any information along with the transactions to determine prioritized locations. For example, the processor 205 may execute the retrieving application for other sources include internal data known within the contact center 102 or external data retrieved from publicly, privately, proprietarily, etc. available sources including social media feeds, news feeds, etc. it should be noted that the related further data may also entail analytic techniques performed for the various transactions such as voice analyses, speech analyses, text analyses, etc.

In step 320, the server 130 generates prioritized location data corresponding to a prioritized location that is determined also by the server 130. The server 130 may utilize any mechanism or analysis technique to determine the prioritized location based upon the location data of the transactions as well as any related further data that is available. As discussed above, the server 130 may determine the prioritized location based upon a frequency of transactions having a common location, based upon an importance of transactions, based upon correlations to the related further data, based upon extracted information within the transactions, based upon information known to the contact center 102, etc.

In step 325, the server 130 transmits the prioritized location data. This step relates to when the functionality of the server 130 terminates upon generating the prioritized location. That is, the subsequent functionalities are to be performed by other devices such as the drone guidance system 145, the drone 150, etc. However, if the server 130 is to perform the subsequent functionalities as well, the server 130 simply utilizes the prioritized location data.

Figure 4:
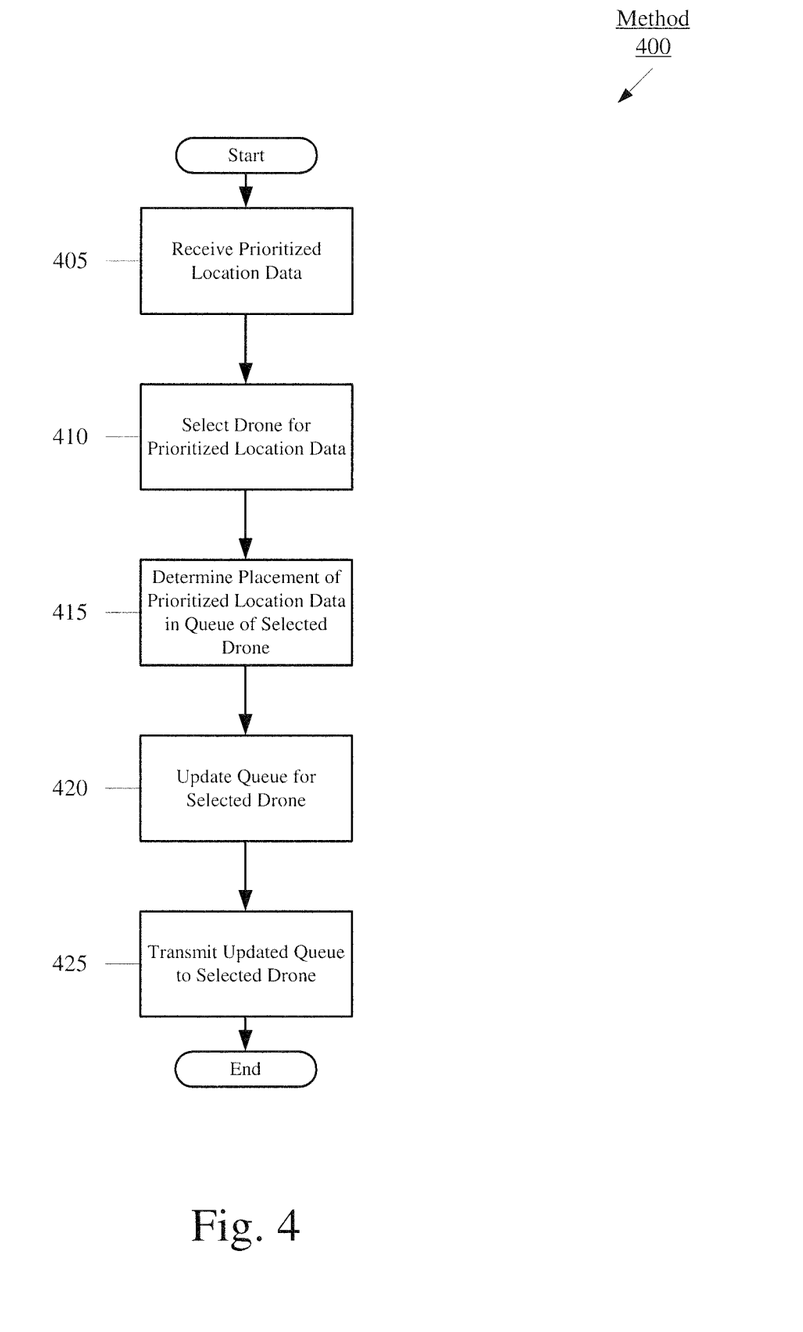
FIG. 4 shows an exemplary method of utilizing prioritized location data according to the present invention.

FIG. 4 shows an exemplary method 400 of utilizing prioritized location data according to the present invention. As discussed above, the exemplary embodiments may incorporate a second aspect in which the prioritized location data that is determined is assigned to a selected drone 150, assigned an appropriate operation, and incorporated into a queue of the selected drone. The method 400 may relate to this second aspect of the exemplary embodiments. The method 400 will be described with regard to the system 100 of FIG. 1 and the server 130 of FIG. 2. Accordingly, the method 300 will be described with reference to the server 130 performing the functionalities herein. However, as discussed above, the functionalities may be performed by other devices such as the drone guidance system 145, the drone 150, etc.

In step 405, the server 130 utilizes the prioritized location data. Although the method 400 is described with reference to the server 130 performing the following functionalities, when a different component such as the drone guidance system 145 performs the following functionalities, the prioritized location data may be received from being transmitted by the server 130 of the contact center 102.

In step 410, the server 130 selects a drone 150 for the determined prioritized location data. As discussed above, the contact center 102 may have more than one drone 150 available for the features of the exemplary embodiments. Based upon any number of factors, the server 130 may select the drone 150. For example, a load, a capacity, a technical capability, a current disposition, etc. may be used to select the drone 150.

In step 415, the server 130 determines placement of the determined prioritized location data in the queue of the selected drone 150. Initially, the server 130 may receive or retrieve the queue of the selected drone 150. For example, the queue may have been stored in the memory arrangement 210 of the server 130. In another example, the queue may be requested from the drone guidance system 145 and subsequently received therefrom. The server 130 may then determine a manner of incorporating the currently determined prioritized location within the prioritized locations of the queue which are already ordered according to any one or more criteria such as an importance factor or a temporal factor.

Once a position of the currently determined prioritized location is found for the queue of the selected drone 150, in step 420, the server 130 updates the queue for the selected drone 130. In step 425, the server 130 transmits the updated queue to the selected drone 150. For example, if a direct connection is established between the contact center 102 and the selected drone 150 or if granted permission for such a transmission, the server 130 may transmit the updated queue directly to the selected drone 150. In another example, the server 130 may transmit the updated queue to the selected drone 150 using an intermediary such as the drone guidance system 145.

The exemplary embodiments may be utilized for a variety of different services related to the contact center 102. In a first example, the contact center 102 may be related to a telemarketing service. As a telemarketing service, the contact center 102 may perform transactions for requests of a product. Accordingly, the exemplary embodiments may be used with the drones 150 in a delivery capacity. In a second example, the contact center 102 may be related to product services. As a product service, the contact center 102 may provide instructions or other related information regarding the product which may be relayed via the drones 150. In a third example, the contact center 102 may be related to emergency services such as a Public-Safety Answering Point (PSAP). As an emergency service, the contact center 102 may provide information of a location and/or provide immediate services.

The exemplary embodiments provide a device, system, and method for a contact center based automated vehicle guidance system. The exemplary embodiments relate to a contact center performing transactions from at least one electronic device. The transactions may provide location data associated specifically with the electronic device. The exemplary embodiments may also utilize further analyses as well as other information along with the location data to determine prioritized locations. The prioritized locations may be positions that a drone is to move to perform a predetermined operation.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a contact center,
performing a transaction between an electronic device and the contact center, the transaction including at least one correspondence between a user of the electronic device and the contact center;
determining location data corresponding to the electronic device, the location data being indicative of a location of the electronic device;
determining prioritized location data based upon the location data and further related data, the further related data being at least one of an analysis of the at least one correspondence, internal information of the contact center, and external information available to the contact center, wherein the prioritized location data indicates a priority of the location of the electronic device relative to one or more other locations corresponding to respective one or more other transactions; and transmitting the prioritized location data to an unmanned, automated vehicle (UAV), the UAV configured to automatically move to the location of the electronic device and the one or more other locations in an order corresponding to the priority indicated by the prioritized location data.

2. The method of claim 1, wherein the transaction is one of a plurality of transactions, each of the transactions being from a respective electronic device.

3. The method of claim 2, wherein the further related data includes a further analysis of the transactions, the further analysis including a frequency of the transactions originating from electronic devices disposed in a substantially common area.

4. The method of claim 1, wherein the transaction is one of a voice call, a video call, a chat session, an email, and a combination thereof.

5. The method of claim 1, wherein the analysis of the at least one correspondence includes voice analyses, text analyses, metadata analyses, speech analyses, and a combination thereof.

6. The method of claim 1, wherein the internal information includes information previously stored in the contact center.

7. The method of claim 1, wherein the external information includes at least one of social media feeds and news feeds.

8. The method of claim 1, wherein the UAV is a drone.

9. The method of claim 1, wherein the UAV has a queue including a plurality of previously determined prioritized locations.

10. The method of claim 9, wherein the previously determined prioritized locations of the queue are ordered based on at least one of a capacity of the UAV, a load of the UAV, technical capabilities of the UAV, a position of the UAV, an optimized route of the UAV, and a combination thereof.

11. The method of claim 1, wherein the UAV is one of a plurality of UAVs.

12. The method of claim 11, further comprising:
selecting the UAV from the plurality of UAVs for the prioritized location data.

13. The method of claim 9, further comprising:
determining a placement of the prioritized location data in the queue;
updating the queue; and
transmitting the updated queue to the UAV.

14. A server of a contact center, comprising:
a transceiver configured to transmit data to an unmanned, automated vehicle (UAV); and
a processor configured to perform a transaction with an electronic device, the transaction including at least one correspondence between a user of the electronic device and an agent of the contact center, the processor configured to determine location data corresponding to the electronic device, the location data being indicative of a location of the electronic device, the processor configured to determine prioritized location data based upon the location data and further related data, the further related data being at least one of an analysis of the at least one correspondence, internal information of the contact center, and external information available to the contact center, wherein the prioritized location data indicates a priority of the location of the electronic device relative to one or more other locations corresponding to respective one or more other transactions,
wherein the transceiver is configured to transmit the prioritized location data to the UAV, the UAV configured to automatically move to the location of the electronic device and the one or more other locations in an order corresponding to the priority indicated by the prioritized location data.

15. The server of claim 14, wherein the transaction is one of a voice call, a video call, a chat session, an email, and a combination thereof.

16. The server of claim 14, wherein the UAV has a queue including a plurality of previously determined prioritized locations.

17. The server of claim 16, wherein the processor is further configured to determine a placement of the prioritized location data in the queue, update the queue, and transmit the updated queue to the UAV.

18. The server of claim 14, wherein the transceiver transmits the prioritized location data to an automated vehicle guidance system which forwards the prioritized location data to the UAV.

19. The server of claim 14, wherein the UAV is a drone.

20. A system, comprising:
an unmanned, automated vehicle (UAV) configured to receive prioritized location data and automatically move to a location of an electronic device and one or more other locations in an order corresponding to a priority of the location of the electronic device indicated by the prioritized location data; and
a server of a contact center configured to:
perform a transaction with an electronic device, the transaction including at least one correspondence between a user of the electronic device and an agent of the contact center;
determine location data corresponding to the electronic device, the location data being indicative of a location of the electronic device;
determine the prioritized location data based upon the location data and further related data, the further related data being at least one of an analysis of the at least one correspondence, internal information of the contact center, and external information available to the contact center, wherein the prioritized location data indicates the priority of the location of the electronic device relative to one or more other locations corresponding to respective one or more other transactions; and
transmit the prioritized location data to the UAV.

* * * * *